(12) United States Patent
Laycock

(10) Patent No.: US 8,797,827 B2
(45) Date of Patent: Aug. 5, 2014

(54) SEISMIC ACQUISITION SYSTEM

(75) Inventor: Martin Laycock, Asker (NO)

(73) Assignee: WesternGeco L.L.C., Houston, TX (US)

( * ) Notice: Subject to any disclaimer, the term of this patent is extended or adjusted under 35 U.S.C. 154(b) by 410 days.

(21) Appl. No.: 12/976,541

(22) Filed: Dec. 22, 2010

(65) Prior Publication Data

US 2011/0090759 A1    Apr. 21, 2011

Related U.S. Application Data

(62) Division of application No. 11/534,983, filed on Sep. 25, 2006, now Pat. No. 7,885,143.

(60) Provisional application No. 60/806,590, filed on Jul. 5, 2006.

(51) Int. Cl.
*G01V 1/00* (2006.01)
*G01V 13/00* (2006.01)
*H04L 7/00* (2006.01)

(52) U.S. Cl.
CPC *G01V 1/00* (2013.01); *G01V 13/00* (2013.01); *G01V 2200/12* (2013.01); *H04L 7/0012* (2013.01)
USPC .............................. 367/50; 367/31

(58) Field of Classification Search
CPC ... H04L 7/00; H04L 7/0012; H04W 56/0015; G01V 13/00
USPC ........................ 367/23, 49, 113, 169; 181/111
See application file for complete search history.

(56) References Cited

U.S. PATENT DOCUMENTS

| | | | |
|---|---|---|---|
| 3,416,631 A | 12/1968 | Patterson | |
| 3,432,805 A | 3/1969 | Romberg | |
| 3,881,167 A | 4/1975 | Pelton et al. | |
| 3,900,825 A | 8/1975 | Hinnant | |
| 4,037,190 A | 7/1977 | Martin | |
| 4,324,310 A | 4/1982 | Wener et al. | |
| 4,493,067 A * | 1/1985 | Thomas et al. | 367/189 |
| 4,511,999 A | 4/1985 | Bowden et al. | |

(Continued)

FOREIGN PATENT DOCUMENTS

| | | |
|---|---|---|
| CN | 1118071 | 3/1996 |
| CN | 201222100 | 4/2009 |
| GB | 2333841 | 8/1999 |
| WO | 0116622 | 3/2001 |

OTHER PUBLICATIONS

Remco Muijs et al., "Data-driven adaptive decompostion of multicomponent seabed recordings," Geophysics, Sep.-Oct. 2004, vol. 69(5): pp. 1329-1337.

(Continued)

*Primary Examiner* — Krystine Breier

(57) ABSTRACT

Various technologies for a seismic acquisition system, which may include an acquisition central system configured to determine a desired start time for a sweep cycle in one or more vibrators and a recorder source system controller in communication with the acquisition central system. The recorder source system controller may be configured to receive the desired start time from the acquisition central system. The seismic acquisition system may further include one or more vibrator units in communication with the recorder source system controller. Each vibrator unit may be configured to start a sweep cycle in a vibrator at the desired start time.

13 Claims, 5 Drawing Sheets

(56) References Cited

U.S. PATENT DOCUMENTS

| | | | |
|---|---|---|---|
| 4,512,001 | A | 4/1985 | Mayne et al. |
| 4,567,583 | A | 1/1986 | Landrum, Jr. |
| 4,598,392 | A | 7/1986 | Pann |
| 4,680,741 | A | 7/1987 | Wales et al. |
| 4,766,576 | A | 8/1988 | Sallas et al. |
| 4,800,538 | A * | 1/1989 | Passmore et al. ............... 367/55 |
| 4,811,999 | A | 3/1989 | Remington et al. |
| 4,823,326 | A | 4/1989 | Ward |
| 4,864,546 | A | 9/1989 | Russell et al. |
| 4,885,724 | A | 12/1989 | Read et al. |
| 4,907,670 | A | 3/1990 | Anstey |
| 5,050,129 | A | 9/1991 | Schultz |
| 5,327,399 | A | 7/1994 | Asada et al. |
| 5,347,494 | A | 9/1994 | Andersen |
| 5,410,517 | A | 4/1995 | Andersen |
| 5,548,562 | A * | 8/1996 | Helgerud et al. ............... 367/14 |
| 5,715,213 | A | 2/1998 | Allen |
| 6,002,339 | A | 12/1999 | Norris |
| 6,181,646 | B1 | 1/2001 | Bouyoucos et al. |
| 6,188,962 | B1 | 2/2001 | Morgan et al. |
| 6,859,079 | B2 * | 2/2005 | Haraguchi et al. ............ 327/156 |
| 7,050,356 | B2 | 5/2006 | Jeffryes |
| 7,359,282 | B2 | 4/2008 | Tulett |
| 7,885,143 | B2 | 2/2011 | Laycock |
| 2003/0210609 | A1 | 11/2003 | Jeffryes |
| 2007/0133354 | A1 | 6/2007 | Bagaini et al. |
| 2007/0195644 | A1 | 8/2007 | Marples et al. |
| 2009/0135671 | A1 | 5/2009 | Meunier |
| 2013/0201906 | A1 * | 8/2013 | Dittrich et al. ................ 370/324 |

OTHER PUBLICATIONS

Lasse Admundsen et al., "Rough-sea deghosting of streamer seismic data using pressure gradient approximations," Geophysics, Jan.-Feb. 2005, vol. 70(1): pp. V1-V9.

Johan O. A. Robertsson et al., "Rough-sea deghosting using a single streamer and a pressure gradient approximation," Geophysics, Nov.-Dec. 2002, vol. 67(6): pp. 2005-2011.

Schalkwijk, "Decomposition of multicomponent ocean-bottom data into P- and S-waves," Thesis, Delft University, The Netherlands, 2001: pp. 41-43 only.

MacKay; "Information Theory Inference and Learning Algorithms," 2003: pp. 549-551.

Integrated DGPS Vibrator Control System, Feb. 2001, (ftp://ftp.sercel.com/pdf/brochures/integratedDGPS.pdf).

VE464, May 2007, (ftp://ftp.sercel.com/pdf/brochures/ve.464.pdf).

Vibrator Control System Product Brochure (ftp://ftp.sercel.com/pdf/brochures/integratedDPGS.pdf; published Feb. 2001).

GCC/SIPO Office action (Mar. 2011); from GCC / P / 2007 / 8644 (GCC counterpart to US 60/806,590 priority case).

* cited by examiner

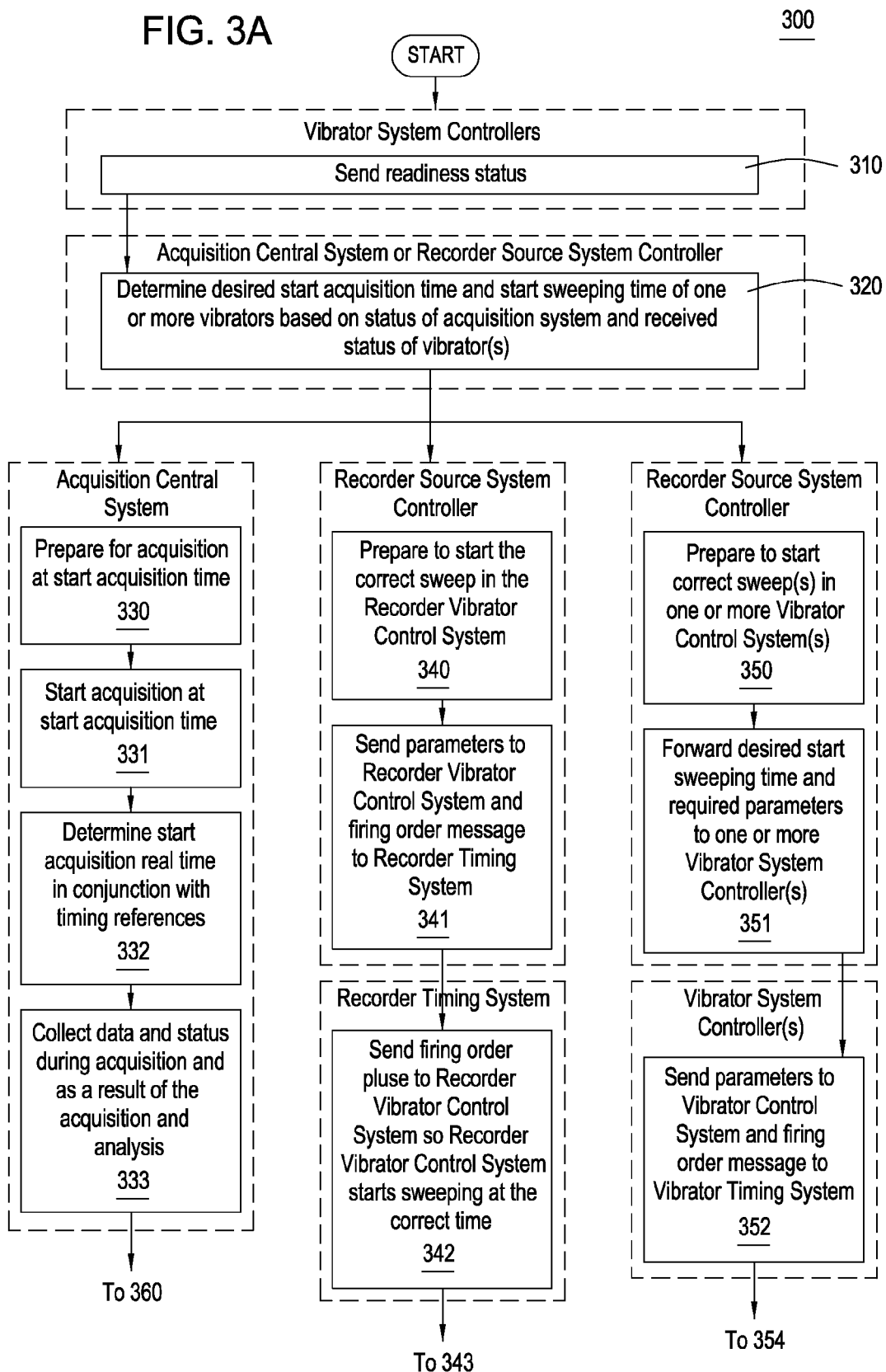

SEISMIC ACQUISITION SYSTEM

CROSS-REFERENCE TO RELATED APPLICATIONS

This application is a divisional of U.S. patent application Ser. No. 11/534,983, filed Sep. 25, 2006, now U.S. Pat. No. 7,885,143, which claims the benefit of and priority to U.S. provisional patent application Ser. No. 60/806,590, filed Jul. 5, 2006; the disclosures of each of which are incorporated herein by reference.

BACKGROUND

1. Field of the Invention

Implementations of various technologies described herein generally relate to seismic acquisition.

2. Description of the Related Art

The following descriptions and examples are not admitted to be prior art by virtue of their inclusion within this section.

A seismic survey typically includes a plurality of seismic sources and an acquisition system consisting of a central system and a plurality of deployed sensors configured to measure and record signals reflected from sub-surface layers as a result of the force exerted on the earth by the seismic sources.

In a vibroseis seismic survey, one or more vibrator units are typically used as the seismic source. Each vibrator unit may include a vehicle mounted actuator, capable of exerting force on the ground, typically in the form of a sweep of frequencies. Each vibrator unit may be controlled by a vibrator control system, which is configured to create a specified reference sweep and ensure that force exerted on the ground by the actuator follows the reference sweep as closely as possible. The coordination of multiple vibrator units and their corresponding vibrator control systems is typically accomplished by a recorder vibrator control system found in the acquisition system. The recorder vibrator control system sends synchronization signals via radio to the individual vibrator control systems that define the time the vibrator unit will start its sweep.

Several disadvantages exist with current synchronization technologies, which typically depend on setting various measured delay values to compensate for radio transmission times and other factors. The initial measurement of these delays and confirmation of system timing can be a time consuming process.

In addition, post acquisition checks may be performed to measure the accuracy of internal oscillators within vibrator control systems and gross errors in radio delays or start times. Checks during acquisition may also be performed to measure the accuracy of synchronization for specific sweep starts.

Checks performed periodically or during acquisition may be known as similarity checks. Two types of similarity checks are commonly used. The first, a radio similarity check, may take place several times daily for each vibrator in use during a normal acquisition cycle. In this method, a sweep signal from a vibrator unit's vibrator control system is passed in real time by analog modulation over a radio channel to the recorder vibrator control system, where it can be compared to a special reference signal, which was previously adjusted to be time consistent with the received signal. The radio similarity method can provide a check on the timing of the vibrator's sweep relative to that reference, but assumes all previously measured delays and adjustments are correct. The radio similarity method can also provide information about the quality of the vibrator sweep, such as its relative phase, its force and its level of distortion. While the data is acquired during normal production, the analysis of the data for all vibrators in use may be time consuming.

The second method, known as a wireline or hardwire similarity, is typically not performed during a normal acquisition, but during a test schedule or following maintenance on the vibrators, which may be time consuming. In the second method, one or more vibrator units may be positioned so that sweep signals can be acquired by direct connection to the acquisition system or its field units. Like the first method, analysis of the data may also be a time consuming process.

SUMMARY

Described here are implementations of various technologies for a seismic acquisition system, which may include an acquisition central system configured to determine a desired start time for a sweep cycle in one or more vibrators and a recorder source system controller in communication with the acquisition central system. The recorder source system controller may be configured to receive the desired start time from the acquisition central system. The seismic acquisition system may further include one or more vibrator units in communication with the recorder source system controller. Each vibrator unit may be configured to start a sweep cycle in a vibrator at the desired start time.

Described here are implementations of various technologies for a recorder for a seismic acquisition system, which may include an acquisition control system configured to determine a desired start sweeping time for one or more vibrators and a system controller in communication with the acquisition central system. The system controller may be configured to receive the desired start sweeping time from the acquisition central system.

Described here are implementations of various technologies for a vibrator unit for a seismic acquisition system, which may include a vibrator and a control system in communication with the vibrator. The control system may be configured to start a sweep cycle in the vibrator at a desired start time. The vibrator unit may further include a timing system in communication with the control system. The timing system may be configured to send a pulse to the control system to cause the control system to start the sweep cycle in the vibrator at the desired start time.

Described here are implementations of various technologies for a method for starting a sweep cycle in a vibrator. The method may include receiving a firing order containing a desired start time for the sweep cycle and sending a pulse to a vibrator control system a predetermined amount of time prior to the desired start time to cause the vibrator control system to start the sweep cycle in the vibrator at the desired start time.

Described here are implementations of various technologies for a method for measuring a start time of a sweep cycle in a vibrator. The method may include sending a pulse to a vibrator control system to cause the vibrator control system to start the sweep cycle in the vibrator at the start time, receiving a time break pulse from the vibrator control system at the time the sweep cycle is started and measuring the time at which the time break pulse is received using a first real time clock synchronized with a first global positioning system.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

FIGS. 3A-C illustrate a flow diagram of a method for starting a sweep cycle in accordance with implementations of various technologies described herein.

DETAILED DESCRIPTION

Figure 1:
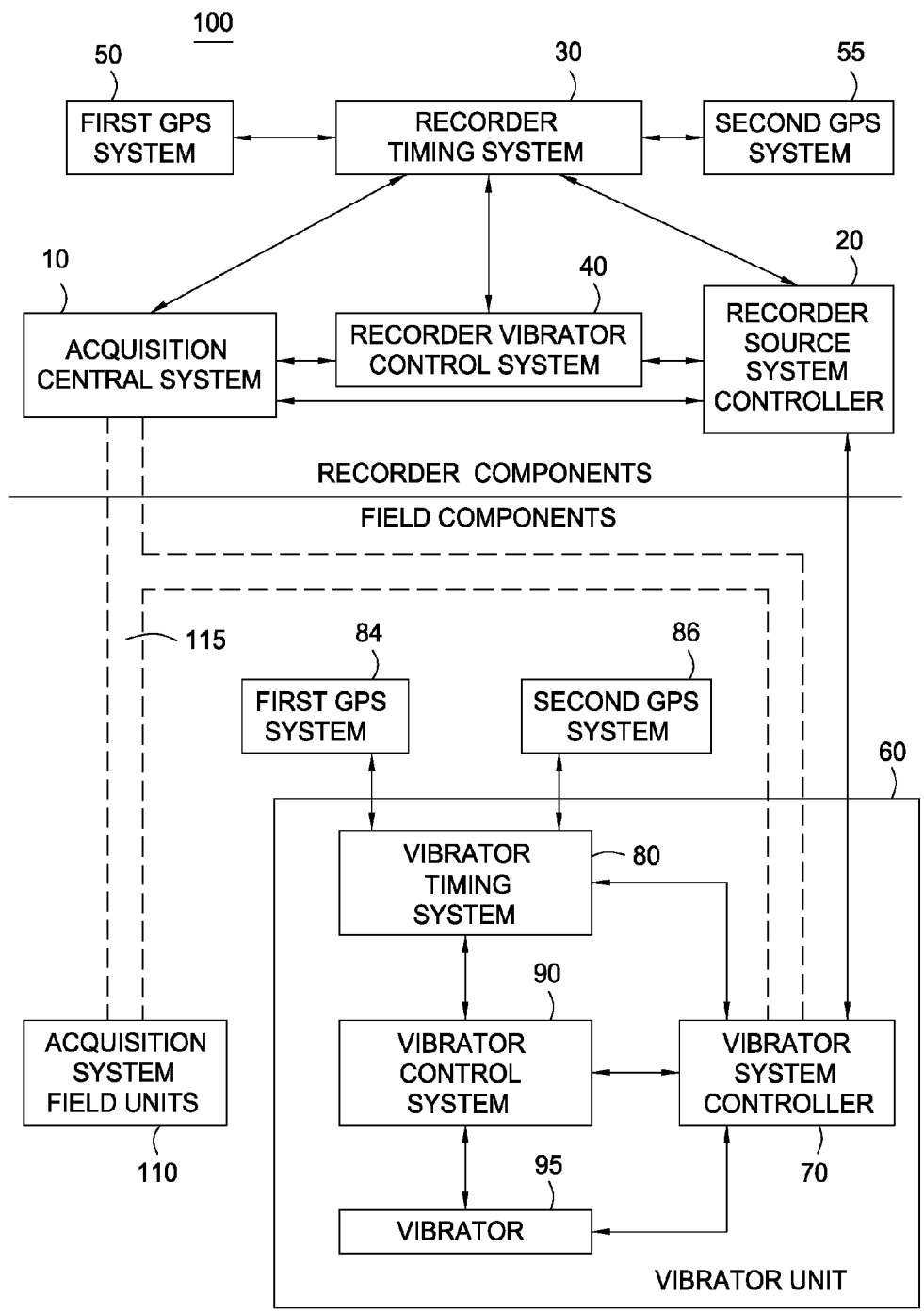
FIG. 1 illustrates a block diagram of a seismic acquisition system in accordance with implementations of various technologies described herein.

FIG. 1 illustrates a block diagram of a seismic acquisition system 100 in accordance with implementations of various technologies described herein. The seismic acquisition system 100 may include both recorder components and field components. The recorder components may include an acquisition central system 10, a recorder source system controller 20, a recorder timing system 30, and a recorder vibrator control system 40 that may all be in communication with each other via communication means, such as hardwire, fiber optic, cable, Ethernet network, fiber channel network, radio, wireless, satellite and the like. The field components may include a plurality of acquisition system field units 110 and a plurality of vibrator units 60 that may all be in communication with the acquisition central system 10 via a data transport mechanism 115. In addition, the field vibrator units 60 may further be in communication with the recorder source system controller 20 via a wireless network, satellite or any other communication means that would facilitate communications between the two components.

The acquisition central system 10 may be configured to determine a desired start sweeping time for each vibrator 95 and send the desired start sweeping time to the recorder source system controller 20. In one implementation, the desired start sweeping time may be the same for each vibrator 95. In addition to the desired start sweeping time, the acquisition central system 10 may also send other information, such as information relating to the particular type of sweep, information relating to each vibrator 95 and the like.

The acquisition central system 10 may include a central processing unit (CPU), a storage device and a bus that couples the storage device to the CPU. The storage device may include one or more program modules, such as routines, programs, components and the like, which may be executable by the CPU. The program modules may be configured to control various aspects of the seismic acquisition system 100, including configuration and parameters; acquisition and source scheduling; acquisition execution; control, process, visualization and storage of acquired data; process of acquisition data; generation, visualization and storage of acquisition data attributes; visualization and storage of source data and attributes; testing of the seismic acquisition system 100 and the like. The storage device may further include program modules to schedule (or to enable the recorder source system controller 20 to schedule) acquisitions based on status received from the acquisition system field units 110, the recorder source system controller 20 and the vibrator system controllers 70. The acquisition central system 10 may further include communication and control interfaces enabling the program modules to communicate with other components of the seismic acquisition system 100. The acquisition central system 10 may further include an operator interface to facilitate communication with an operator. In addition, the acquisition central system 10 may include auxiliary acquisition units configured to measure reference sweeps communicated by the recorder vibrator control system 40.

The recorder source system controller 20 may be configured to control the operation of the recorder vibrator control system 40. The recorder source system controller 20 may send configuration and reference sweep parameters to the recorder vibrator control system 40 to start a reference sweep in the recorder vibrator control system 40 at a predetermined time. In one implementation, in response to receiving the desired start sweeping time from the acquisition central system 10, the recorder source system controller 20 sends a firing order, which includes the desired start sweeping time, to the recorder timing system 30. The firing order provides a set of instructions to the recorder timing system 30 to generate a precisely timed pulse to the recorder vibrator control system 40 at the firing time. The recorder source system controller 20 may also cause the recorder timing system 30 to confirm the start time of the reference sweep in the recorder vibrator control system 40. In another implementation, in response to receiving the desired start sweeping time from the acquisition central system 10, the recorder source system controller 20 may forward the desired start sweeping time to a vibrator system controller 70, which will be discussed in more detail in the following paragraphs. Although the recorder source system controller 20 is described as sending the desired start sweeping time to one vibrator system controller, it should be understood that the recorder source system controller 20 may send the desired start sweeping time to more than one vibrator system controller.

The recorder source system controller 20 may also include a central processing unit (CPU), a storage device and a bus that couples the storage device to the CPU. The storage device may include one or more program modules, such as routines, programs, components and the like, which may be executable by the CPU. Additionally, the recorder source system controller 20 may include an operator interface for facilitating communication with the operator.

In one implementation, the storage device of the recorder source system controller 20 may include one or more program modules configured to control the recorder vibrator control system 40 and the recorder timing system 30 such that the recorder vibrator control system 40 can start the reference sweep at a predetermined time and that the sweep start time can be measured and separately confirmed. The program modules may also be configured to receive configuration, parameters, status or other data from the recorder vibrator control system 40 and the recorder timing system 30.

In another implementation, the storage device of the recorder source system controller 20 may also include program modules configured to send and receive configurations, parameters, sweep start times and confirmation regarding sweep start times to the vibrator system controller 70. In yet another implementation, the storage device of the recorder source system controller 20 may also include program modules configured to calculate predetermined sweep start times, when enabled by the acquisition central system 10. Such calculations may be based on configurations, parameters, status or data received from the vibrator system controller 70. In still yet another implementation, the storage device may further include program modules configured to perform various analyses, such as analysis of timing data used and generated by each seismic acquisition, analysis of received status or data pertaining to sweep generation or vibrator performance, and the like. In addition, one or more of these program modules may be configured to generate, visualize, store and communicate various data, analysis and derived attributes to the acquisition central system 10.

The recorder timing system 30 may include a first real time clock and a second real time clock, both of which may be synchronized with a first global positioning system (GPS) 50 and a second GPS 55, respectively. In this manner, the recorder timing system 30 may maintain an accurate first real time clock and an accurate second real time clock. The real time clocks and other components of the recorder timing system 30 will be described in more detail with reference to FIG. 2 in the paragraphs below.

In one implementation, the recorder timing system 30 may be configured to provide timing references to the acquisition central system 10, enabling the acquisition central system 10 to establish its own synchronous timing. In another implementation, the recorder timing system 30 may further be configured to communicate timing pulses to the recorder vibrator control system 40. Such communications may be used for the synchronization of an internal process control timing oscillator contained in the recorder vibrator control system 40. In a further implementation, in response to receiving a firing order from the recorder source system controller 20, the recorder timing system 30 may further be configured to provide a firing order pulse to the recorder vibrator control system 40 a predetermined amount of time prior to the desired start sweeping time. This predetermined amount of time may be based on the amount of time it takes for the recorder vibrator control system 40 to set up the sweep generator. In yet another implementation, the recorder timing system 30 may be configured to receive a time break pulse from the recorder vibrator control system 40 at the time a reference sweep is generated. In response, the recorder timing system 30 may measure (or time stamp) the time at which the time break is received. In one implementation, the time break may be measured by both the first and second real time clocks. Both time measurements of the time break may then be forwarded to the recorder source system controller 20. Additionally, the recorder timing system 30 may communicate GPS position data and attributes to the acquisition central system 10, the recorder source system controller 20 and/or the recorder vibrator control system 40.

The recorder vibrator control system 40 may include a sweep generator for generating the reference sweep. In one implementation, the recorder vibrator control system 40 may be configured to start a reference sweep at the desired start sweeping time in response to receiving a pulse from the recorder timing system 30. Although the reference sweep may be generated by the recorder vibrator control system 40, it should be understood that, in other implementations, the reference sweep may be generated by the acquisition central system 10 or the recorder source system controller 20.

The seismic acquisition system 100 may further include a vibrator unit 60 as its seismic source. Although only one vibrator unit 60 is illustrated, it should be understood that the seismic acquisition system 100 may include more than one vibrator unit 60. The vibrator unit 60 may include a vibrator system controller 70 in communication with a vibrator timing system 80, a vibrator control system 90, which is configured to control the operation of a vibrator 95, and a vibrator 95.

The vibrator system controller 70 may be configured to control the operation of the vibrator control system 90. The vibrator system controller 70 may send predetermined configuration and sweep parameters to the vibrator control system 90 to start a sweep in the vibrator 95 at a predetermined time. In one implementation, in response to receiving the desired start sweeping time from the recorder source system controller 20, the vibrator system controller 70 sends a firing order, which includes the desired start sweeping time, to the vibrator timing system 80. The vibrator system controller 70 may also cause the vibrator timing system 80 to confirm the start time of the sweep in the vibrator 95.

In another implementation, the vibrator system controller 70 may be configured to acquire signals generated by the vibrator 95 and the vibrator control system 90. The acquired signals may include reference sweeps, measured or calculated output sweeps, other servo-hydraulic system sensor measurements performed during a sweep.

The vibrator system controller 70 may also include a central processing unit (CPU), a storage device and a bus that couples the storage device to the CPU. The storage device may include one or more program modules, such as routines, programs, components and the like, which may be executable by the CPU. Additionally, the vibrator system controller 70 may include an operator interface for facilitating communication with the operator.

In one implementation, the storage device of the vibrator system controller 70 may include one or more program modules configured to receive, store, implement or forward communications from the recorder source system controller 20, the vibrator timing system 80, the vibrator control system 90 and the vibrator 95. Such communications may include sweep start times, configuration, parameters, status information and other data.

In another implementation, the storage device of the vibrator system controller 70 may include program modules to control the vibrator control system 90 and the vibrator timing system 80 such that the vibrator control system 90 can start sweeping in the vibrator 95 at a predetermined time. In yet another implementation, the storage device of the vibrator system controller 70 may further include program modules to measure and confirm the sweep start time.

In still another implementation, the storage device of the vibrator system controller 70 may include program modules configured to calculate navigation information and forward such information to the operator to aid the operator in positioning the vibrator unit correctly. In still yet another implementation, such program modules may communicate with program modules executing in other vibrator units 60 operating in a group such that the pattern of their positions may be optimized. In another implementation, the storage device of the vibrator system controller 70 may include program modules configured to calculate the readiness of the vibrator unit 60 to start sweeping. Readiness may depend on the configuration, status and position of the vibrator 95, as well as that of the other components of the vibrator unit 60. Such program modules may communicate with program modules executing in other vibrator units 60 operating in a group such that readiness of all units in the group may be calculated.

In another implementation, the storage device of the vibrator system controller 70 may include program modules configured to control acquisition of signals generated by the vibrator 95 and the vibrator control system 90. The acquisition signals may be stored within the vibrator system controller 70 for use by other program modules. In yet another implementation, the storage device of the vibrator system controller 70 may also include program modules to analyze the acquisition signals for vibrator status, sweep performance, position and readiness.

The vibrator timing system 80 may include a first real time clock and a second real time clock, both of which may be synchronized with a first global positioning system (GPS) 84 and a second GPS 86, respectively. In this manner, the vibrator timing system 80 may maintain an accurate first real time clock and an accurate second real time clock. The real time clocks and other components of the vibrator timing system 80 will be described in more detail with reference to FIG. 2 in the paragraphs below. Although the first real time clock and the second real time clock may be synchronized with the first GPS 84 and the second GPS 86, respectively, it should be understood that, in other implementations, the first real time clock and the second real time clock may be synchronized with the first GPS 50 and the second GPS 55.

In one implementation the vibrator timing system 80 may be configured to communicate timing pulses to the vibrator control system 90. The timing pulses may be used to synchronize the internal process control timing oscillator contained in the vibrator control system 90. In another implementation, in response to receiving a firing order from the vibrator system controller 70, the vibrator timing system 80 may be configured to provide a firing order pulse to the vibrator control system 90 a predetermined amount of time prior to the desired start sweeping time. This predetermined amount of time may be based on the amount of time it takes for the vibrator control system 90 to set up the vibrator 95. In another implementation, the vibrator timing system 80 may be configured to receive a time break from the vibrator control system 90 at the time a sweep cycle in the vibrator 95 is started. In response, the vibrator timing system 80 may measure (or time stamp) the time at which the time break is received. The time break may be measured by both the first and second real time clocks. Both time measurements of the time break may then be forwarded to the vibrator system controller 70.

The vibrator control system 90 may be configured to start the sweep cycle of the vibrator 95 at the desired start sweeping time in response to receiving a pulse from the vibrator timing system 80. The vibrator 95 may be any seismic vibrator that may be used to generate a wavetrain of energy that propagates through the earth. Although only one vibrator is shown, it should be understood that the vibrator unit 60 may include more than one vibrator.

The seismic acquisition system 100 may further include a plurality of acquisition system field units 110 in communication with the acquisition central system 10 via a data transport mechanism 115. Each acquisition system field unit 110 may include one or more sensors configured to measure signals generated by the vibrators 95 and reflected by the earth's sub-surface. The data transport mechanism 115 may include various electrical components, such as cables, power supplies, transmitters, receivers and the like to facilitate communication between the acquisition system field units 110 and the acquisition central system 10. The data transport mechanism 115 may further facilitate communication between the acquisition central system 10 and the vibrator system controller 70.

Figure 2:
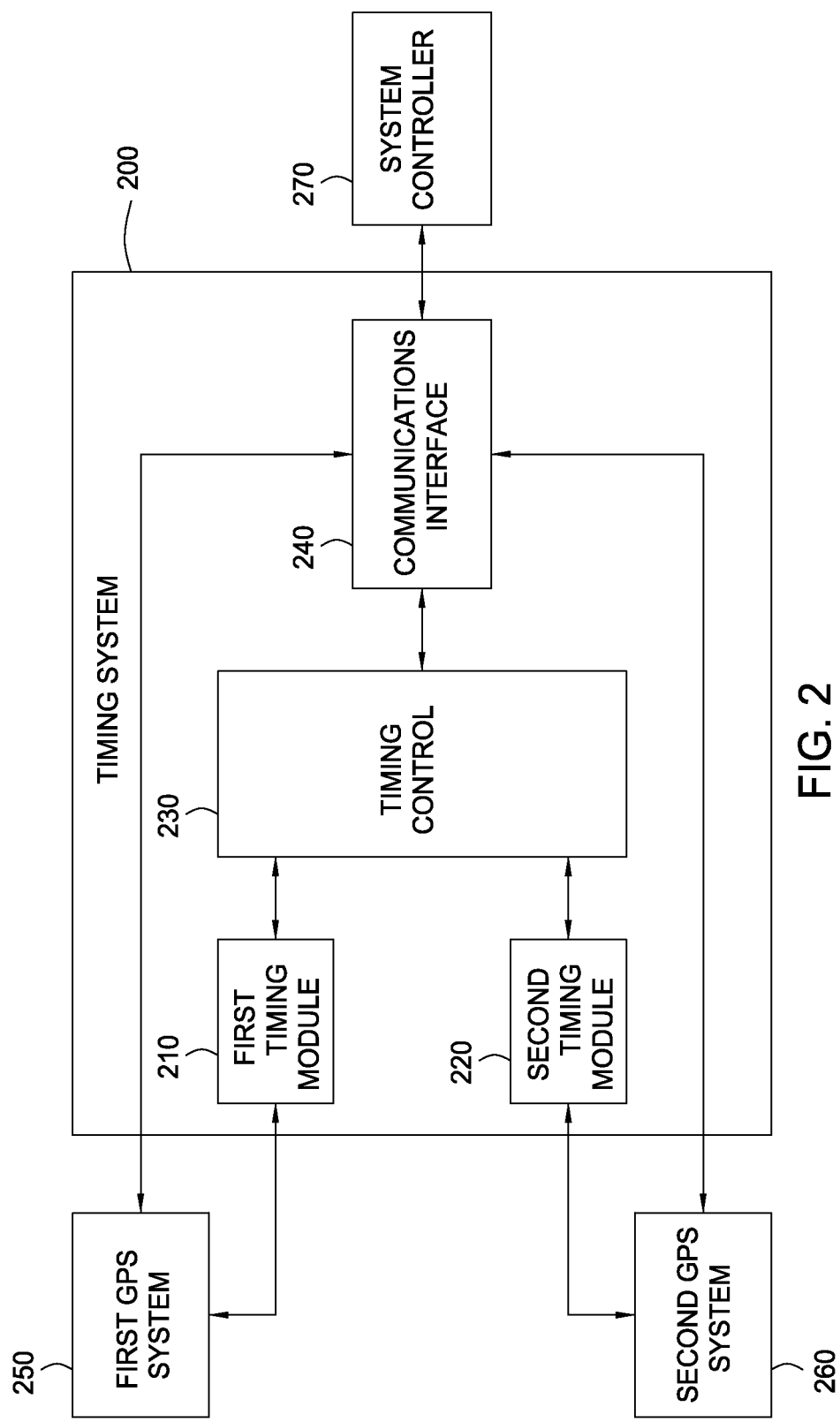
FIG. 2 illustrates a schematic diagram of a timing system in accordance with implementations of various technologies described herein.

FIG. 2 illustrates a schematic diagram of a timing system in accordance with implementations of various technologies described herein. This timing system 200 may be used as the recorder timing system 30 or the vibrator timing system 80. The timing system 200 may include a first timing module 210 and a second timing module 220, both in communication with a timing control 230, which is in communication with a communication interface 240. Timing modules 210 and 220 may each contain a real time clock, which may be used to generate precisely timed signals, such as firing order pulses, and to measure external event times, such as the start times of a sweep pulse.

In one implementation, the first timing module 210 and the second timing module 220 may be synchronized with GPS 250 and GPS 260, respectively. As such, each real time clock may include an oscillator synchronized with a GPS. The oscillator may be synchronized by a one per second pulse generated by the GPS. In this manner, the GPS 250 and GPS 260 may be used as time standards for the first timing module 210 and the second timing module 220, respectively. Although the GPS 250 and GPS 260 are illustrated as being external to the timing system 200, it should be understood that, in some implementations, one or both of the GPSs may be integrated within the timing system 200. Further, although the real time clocks are described herein as being synchronized with GPSs, it should be understood that, in some implementations, the real time clocks may be synchronized using other time synchronization systems, such as satellite technology, radio technology and the like. In addition, the GPS 250 and GPS 260 may be configured to provide position information to the communication interface 240.

If a time standard used to synchronize a real time clock fails or becomes unavailable, the stand-alone accuracy and stability of the oscillator in that real time clock may be able to sustain the accuracy of the real time clock for a period of time. The accuracy and stability of the oscillator may be based on the likelihood of a time standard failure and the accuracy required. The likelihood of time standard failure may be based on the location of the timing system 200 with respect to satellite or radio transmitters, interference with other transmissions, sun spots, the terrain, vegetation, man-made structures surrounding the timing system 200 and the like.

Timing control 230 may be configured to control the operation of the timing modules 210 and 220. For instance, the timing control 230 may be configured to control the routing of signals such as firing order pulses, sweep start pulses, timing pulses, timing messages and the like.

The communications interface 240 may be configured to facilitate communications between the timing control 230 and a system controller 270. The communications interface 240 may be configured to route signals, such as firing order pulses, sweep start pulses, timing pulses, timing messages, GPS position and status messages, and the like. The communications interface 240 may also be configured to receive instructions from a system controller 270 to program the timing control 230 to generate a pulse at a predetermined time and to measure the timing of the pulse. In another implementation, the communications interface 240 may also be configured to receive instructions from a system controller 270 such that each timing module can measure the time of a pulse generated by the other timing module at a predetermined time. When the timing system 200 is used as a recorder timing system 30 (shown in FIG. 1), the system controller 270 may be an acquisition central system 10, a recorder source system controller 20 and a recorder vibrator control system 40. When the timing system 200 is used as a vibrator timing system 80 (shown in FIG. 1), the system controller 270 may be a vibrator system controller 70 and a vibrator control system 80.

Although the timing system 200 is described herein as having two timing modules, it should be understood that in some implementations the timing system 200 may include one timing module or more than two timing modules, depending on the desired characteristics of the timing system.

Figure 3B:
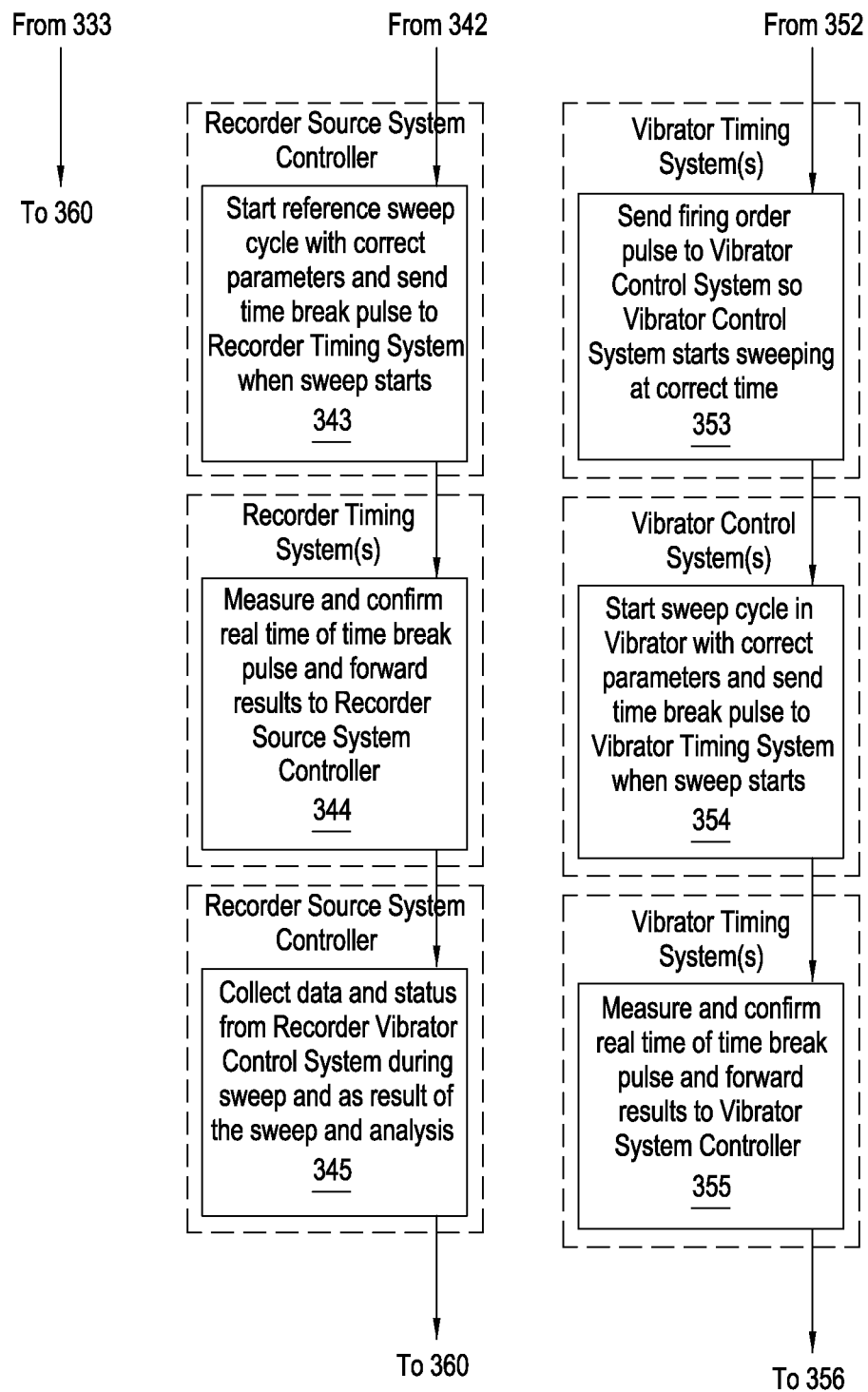
Figure 3C:
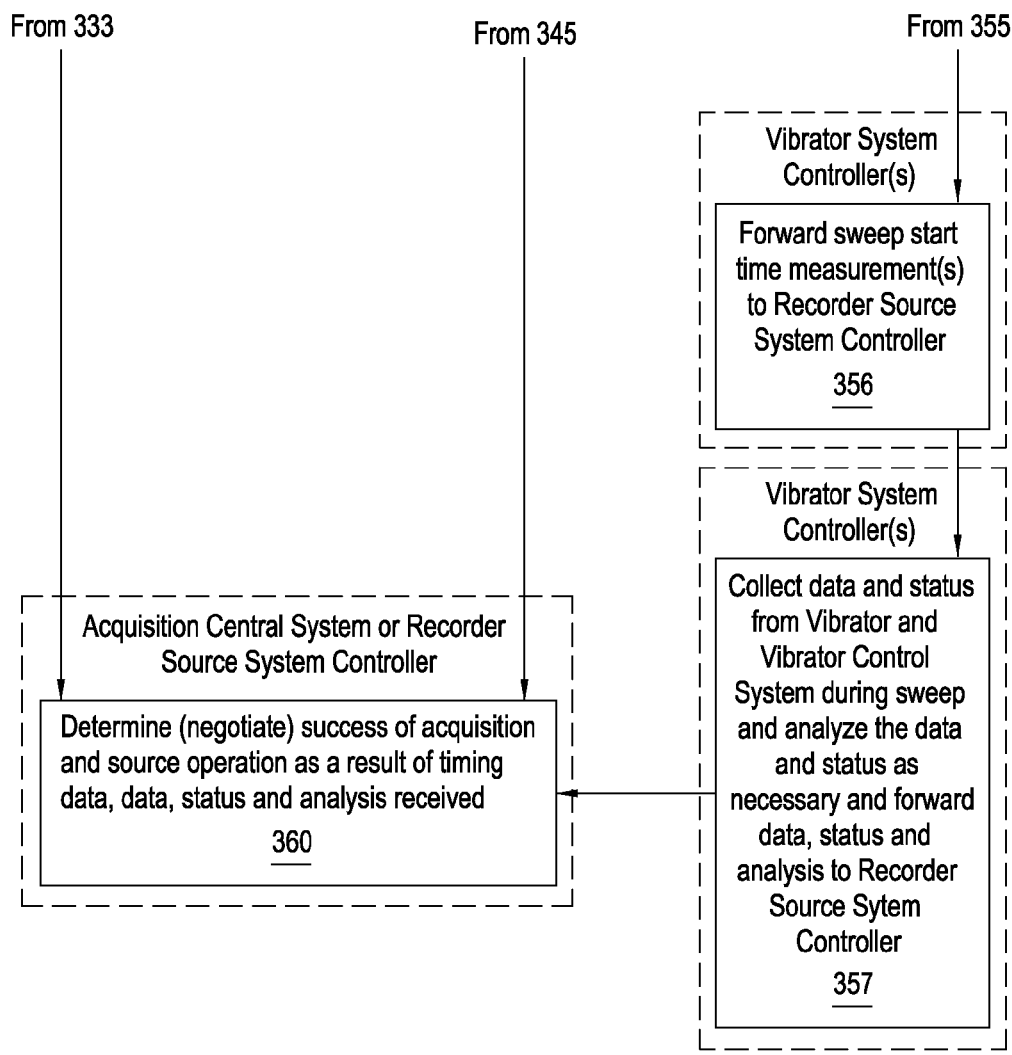

FIGS. 3A-C illustrate a flow diagram of a method 300 for starting a sweep cycle in accordance with implementations of various technologies described herein. At step 310, one or more vibrator system controllers 70 may send status information regarding their readiness to sweep to the acquisition central system 10. Status information may be based on the vibrator unit's current position determined by the vibrator timing system 80, its vibrator status provided by the vibrator 95, and status information provided by the vibrator control system 90. Alternatively, the status information may also be sent to the recorder source system controller 20

At step 320, the acquisition central system 10 (or the recorder source system controller 20) may determine a desired start time for a sweep cycle in one or more vibrators. In some implementations, the acquisition central system 10 may determine other acquisition parameters, such as the particular vibrators to sweep, their parameters and start times, the required reference sweep and its start time and the like.

At step 330, the acquisition central system 10 may prepare to acquire seismic data with the parameters and start time determined in step 320. Internal timing within the acquisition central system 10 may be regulated by timing references provided by the first GPS 50 or the second GPS 55 via the recorder timing system 30. At step 331, the acquisition central system 10 may start acquisition at the acquisition start time. At step 332, the acquisition central system 10 may determine the real time the acquisition started. The real time determination may be based on timing references provided by the first GPS 50 or the second GPS 55 via the recorder timing system 30. At step 333, during acquisition, manipulation or recordation of the seismic data, the acquisition central system 10 may analyze the seismic data to determine the success of the acquisition.

At step 340, the recorder source system controller 20 may prepare to start a reference sweep in the recorder vibrator control system 40. At step 341, the recorder source system controller 20 may send parameters to the recorder vibrator control system 40 such that it may be programmed to generate the reference sweep. The recorder source system controller 20 may also send a firing order message containing the desired start sweeping time to the recorder timing system 30. At step 342, in response to receiving the firing order message, the recorder timing system 30 may send a firing order pulse to the recorder vibrator control system 40. In one implementation, the firing order pulse may be sent a predetermined amount of time prior to the desired start sweeping time. This predetermined amount of time may be based on the amount of time it takes for the recorder vibrator control system 40 to prepare its sweep generator to start at the correct start time. In one implementation, the recorder vibrator control system 40 may have the capability to start sweeping at a predetermined time such that the sweep start command may be facilitated by direct communication with the recorder source system controller 20.

At step 343, in response to receiving the firing order pulse, the recorder vibrator control system 40 may start a reference sweep cycle at the desired start sweeping time and may generate a time break pulse at the time the reference sweep cycle is started. The recorder vibrator control system 40 may send the time break pulse to the recorder timing system 30. Although only one reference sweep is generated, it should be understood that in some implementations multiple reference sweeps may be generated.

At step 344, the communication interface 240 of the recorder timing system 30 may route the received time break pulse to the timing control 230 of the recorder timing system 30. The timing control 230 may use the first timing module 210 of the recorder timing system 30 to measure the real time of the time break by reference to its real time clock. This measured real time of the time break may be sent to the communication interface 240 of the recorder timing system 30, which in turn may forward it to the recorder source system controller 20. In one implementation, the timing control 230 may use the second timing module 220 to measure and confirm the real time of the time break by reference to its real time clock. This second measured real time of the time break may be sent to the communication interface 240, which in turn may forward it to the recorder source system controller 20.

At step 345, the recorder source system controller 20 may determine the success of the reference sweep generation timing based on the measured real time of the time break of the sweep start time. The recorder source system controller 20 may further collect data and status information sent by the recorder vibrator control system 40 during the reference sweep generation. The recorder source system controller 20 may further determine the success of the sweep by reference to and analysis of this collected data.

In one implementation, as an alternative to steps 340 to 345, the recorder source system controller 20 or the acquisition central system 10 may generate single or multiple digital reference sweeps. The system generating the digital reference sweep may analyze data and status information such that the success of the sweeps may be determined.

At step 350, the recorder source system controller 20 may prepare to start the sweeps in one or more vibrator control systems 70. At step 351, the recorder source system controller 20 may forward parameters to the vibrator system controllers 70 such that they may be programmed to generate the correct sweep at the correct start sweep time. At step 352, the vibrator system controller 70 may send a firing order message containing the desired start sweeping time to the vibrator timing system 80. At step 353, in response to receiving the firing order message, the vibrator timing system 80 may send a firing order pulse to the vibrator control system 90. In one implementation, the firing order pulse may be sent a predetermined amount of time prior to the desired start sweeping time. This predetermined amount of time may be based on the amount of time it takes for the vibrator control system 90 to prepare its sweep generator to start at the correct start time. In one implementation, the vibrator control system 90 may have the capability to start sweeping at a predetermined time such that the sweep start command may be facilitated by direct communication with the vibrator system controller 70.

At step 354, in response to receiving the firing order pulse, the vibrator control system 90 may start a sweep cycle in the vibrator 95 at the desired start sweeping time and may generate a time break pulse at the time the sweep cycle is started. The vibrator control system 90 may send the time break pulse to the vibrator timing system 80. At step 355, the communication interface 240 of the vibrator timing system 80 may route the received time break pulse to the timing control 230 of the vibrator timing system 80. The timing control 230 may use the first timing module 210 of the vibrator timing system 80 to measure the real time of the time break by reference to its real time clock. This measured real time of the time break may be sent to the communication interface 240 of the vibrator timing system 80, which in turn may forward it to the vibrator system controller 70. In one implementation the timing control 230 may use the second timing module 220 to measure and confirm the real time of the time break by reference to its real time clock. This second measured real time of the time break may be sent to the communication interface 240, which in turn may forward it to the vibrator system controller 70.

At step 356, the vibrator system controller 70 may determine the success of the sweep timing based on the measured real time of the time break of the sweep start time and may forward such data to the recorder source system controller 20. At step 357, the vibrator system controller 70 may collect data and status information sent by the vibrator 95 and the vibrator control system 90 during the sweep. The vibrator system controller 70 may further determine the success of the sweep by reference to and analysis of this collected data. The vibrator system controller 70 may forward such data and analysis to the recorder source system controller 20.

At step 360, either the acquisition central system 10 or recorder source system controller 20 may use the received data, status and analyses to determine the success of the acquisition. In one implementation, the acquisition may be aborted or discarded as a result of the received data, status and analyses.

In this manner, implementations of various technologies described herein enable every vibrator unit to begin every sweep cycle at the correct time and in synchronization with the signals recorded by the acquisition system and the reference sweep generated by the recorder vibrator control system. Although various technologies have been described with reference to the acquisition central system 10 determining the desired start sweeping time, it should be understood that, in some implementations, the desired start sweeping time may be determined by other components within the seismic acquisition system 100, such as the vibrator system controller 70, the recorder source system controller 20 or the recorder vibrator control system 40. For example, in lieu of the acquisition central system 10 determining the desired start sweeping time, the vibrator system controller 70 may determine the desired start sweeping time and send that time to the recorder source system controller 20, which then communicates with the acquisition central system 10 to determine whether that time is suitable.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A vibrator unit for a seismic acquisition system, comprising:
    a vibrator;
    a control system in communication with the vibrator, wherein the control system is configured to start a sweep cycle in the vibrator at a desired start time; and
    a timing system in communication with the control system, wherein the timing system is configured to send a pulse to the control system to cause the control system to start the sweep cycle in the vibrator at the desired start time, wherein the timing system comprises a first real time clock synchronized with a first time synchronization system and a second real time clock synchronized with a second time synchronization system, wherein the first real time clock is synchronized with a first global positioning system and the second real time clock is synchronized with a second global positioning system.

2. The vibrator unit of claim 1, further comprising a system controller in communication with the timing system, wherein the system controller is configured to send a firing order to the timing system, wherein the firing order comprises the desired start time.

3. The vibrator unit of claim 1, wherein the control system is configured to send a time break pulse to the timing system at the time the sweep cycle is started.

4. The vibrator unit of claim 1, wherein the timing system is configured to measure the time at which the time break pulse is received.

5. A seismic acquisition system, comprising:
    an acquisition central system configured to determine a predetermined start time for a sweep cycle in one or more vibrators;
    a recorder source system controller in communication with the acquisition central system, wherein the recorder source system controller is configured to receive the predetermined start time from the acquisition central system;
    a recorder timing system configured to receive a firing order containing the predetermined start time from the recorder source system controller, wherein the recorder timing system comprises a first real time clock and a second real time clock, and wherein the first real time clock is synchronized with a first time synchronization system and the second real time clock is synchronized with a second time synchronization system; and
    a vibrator control system in communication with the recorder source system controller, wherein the recorder timing system sends a pulse, in response to receiving the firing order, to the vibrator control system a predetermined amount of time prior to the predetermined start time to cause the vibrator control system to start the sweep cycle in the vibrators at the predetermined start time.

6. The seismic acquisition system of claim 5, wherein the predetermined amount of time is based on the amount of time it takes for the vibrator control system to prepare a sweep generator to start at the predetermined start time.

7. The seismic acquisition system of claim 5, wherein the predetermined start time is based on the first real time clock and the second real time clock.

8. The seismic acquisition system of claim 5, further comprising a vibrator system controller in communication with the recorder source system controller, wherein the vibrator system controller is configured to receive the predetermined start time from the recorder source system controller.

9. The seismic acquisition system of claim 8, further comprising a vibrator timing system configured to receive a firing order containing the predetermined start time from the vibrator system controller, wherein the vibrator timing system comprises a third real time clock and a fourth real time clock, and wherein the third real time clock is synchronized with a third time synchronization system and the fourth real time clock is synchronized with a fourth time synchronization system.

10. The seismic acquisition system of claim 9, wherein the third time synchronization system is the same as the first time synchronization system and the fourth time synchronization system is the same as the second time synchronization system.

11. The seismic acquisition system of claim 5, wherein the first time synchronization system and the second time synchronization system comprise satellite technology.

12. The seismic acquisition system of claim 11, wherein the satellite technology comprises a Global Positioning System.

13. The seismic acquisition system of claim 5, wherein the first time synchronization system and the second time synchronization system comprise radio technology.

* * * * *